United States Patent
Park et al.

(10) Patent No.: US 8,584,154 B2
(45) Date of Patent: Nov. 12, 2013

(54) TURN TABLE FOR SPINDLE MOTOR

(75) Inventors: Jae Hyun Park, Gyeonggi-do (KR); Cheong Un Han, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 365 days.

(21) Appl. No.: 12/562,392

(22) Filed: Sep. 18, 2009

(65) Prior Publication Data

US 2010/0083296 A1 Apr. 1, 2010

(30) Foreign Application Priority Data

Sep. 29, 2008 (KR) ........................ 10-2008-0095422

(51) Int. Cl.
*G11B 17/028* (2006.01)

(52) U.S. Cl.
USPC .......................................... 720/707; 720/698

(58) Field of Classification Search
USPC ................................................. 720/695–717
See application file for complete search history.

(56) References Cited

U.S. PATENT DOCUMENTS

| | | | | | |
|---|---|---|---|---|---|
| 4,570,256 | A | * | 2/1986 | Tamaru | 720/704 |
| 4,791,624 | A | * | 12/1988 | Stinesen | 720/704 |
| 5,501,760 | A | * | 3/1996 | Mukawa | 156/305 |
| 2003/0076774 | A1 | * | 4/2003 | Tokumitsu | 369/271 |
| 2005/0022223 | A1 | * | 1/2005 | Hsu et al. | 720/709 |
| 2005/0102693 | A1 | * | 5/2005 | Schuller et al. | 720/718 |
| 2006/0031867 | A1 | * | 2/2006 | Ikemoto | 720/707 |
| 2007/0294713 | A1 | * | 12/2007 | Yoon | 720/712 |
| 2008/0059984 | A1 | * | 3/2008 | Kanzawa et al. | 720/707 |

FOREIGN PATENT DOCUMENTS

| | | |
|---|---|---|
| CN | 1436349 A | 8/2003 |
| JP | 2008-117474 A | 5/2008 |
| WO | WO 2005093739 A1 * | 10/2005 |

OTHER PUBLICATIONS

Office Action dated Jun. 6, 2013 in Chinese Application No. 200910177313.3, filed Sep. 29, 2009.
Office Action dated Aug. 31, 2010 in Korean Application No. 10-2008-0095422, filed Sep. 29, 2008.

* cited by examiner

*Primary Examiner* — Nathan Danielsen
(74) *Attorney, Agent, or Firm* — Saliwanchik, Lloyd & Eisenschenk

(57) ABSTRACT

A turn table of a spindle motor in which a small-diameter disk can be freely attached and detached is disclosed, wherein the disk insertion unit includes an inclination portion guiding the inserted disk, and a vertical portion extensively formed from the inclination portion to the disk accommodation unit to allow an inner periphery of the disk to be brought into contact, and wherein the claw includes an inclination claw portion guiding the inserted disk and a vertical claw portion bent from the inclination claw portion to chuck the disk, and wherein an outer diameter of the vertical portion at the disk insertion unit is 14.94~14.96 mm and an outer diameter of the vertical claw portion at the claw is 15.17~15.23 mm.

9 Claims, 3 Drawing Sheets

TURN TABLE FOR SPINDLE MOTOR

CROSS-REFERENCE TO RELATED APPLICATION

This application claims the benefit under 35 U.S.C. §119 of Korean Application Number 10-2008-0095422, filed Sep. 29, 2008, which is hereby incorporated by reference in its entirety.

BACKGROUND

The present disclosure relates to a turn table of a spindle motor. A DVD (digital video disk) is widely used due to advantage of information recording capacity 6~8 times larger than that of a CD (compact disk). The DVD has a very narrow gap between tracks in which information is recorded as DVD has a large capacity. Due to the fact that the gap is narrow between the tracks, a resiliently supporting claw is applied to accord a center of the DVD on which a turn table is mounted with that of a rotation shaft.

BRIEF SUMMARY

The present disclosure intends to provide a turn table of a spindle motor having an advantageous capacity of free attachment and detachment of a small-diameter disk.

A turn table for spindle motor according to one aspect of the present disclosure comprises: a disk insertion unit into which an inner periphery of a disk is inserted; and a claw resiliently pressing the inserted disk by being protruded at the disk insertion unit, wherein an outer diameter of a vertical portion at the disk insertion unit facing an inner periphery of a small-diameter disk is smaller by 0.01%~0.15% than the inner periphery of the small-diameter disk to enable a chucking of a small-diameter disk having an inner diameter of an inner periphery smaller than 15 mm out of disks.

A turn table for spindle motor according to another aspect of the present disclosure comprises: an axial coupling unit to which a rotation shaft is coupled; a disk insertion unit into which a disk is inserted; an accommodation unit in which the inserted disk is accommodated; and a claw formed at the disk insertion unit for resiliently supporting the inserted disk apart from the disk insertion unit, wherein the disk insertion unit includes an inclination portion guiding the inserted disk, and a vertical portion extensively formed from the inclination portion to the disk accommodation unit to allow an inner periphery of the disk to be brought into contact, and wherein the claw includes an inclination claw portion guiding the inserted disk and a vertical claw portion bent from the inclination claw portion to chuck the disk, and wherein an outer diameter of the vertical portion at the disk insertion unit is 14.94~14.96 mm and an outer diameter of the vertical claw portion at the claw is 15.17~15.23 mm.

DETAILED DESCRIPTION

Figure 1:
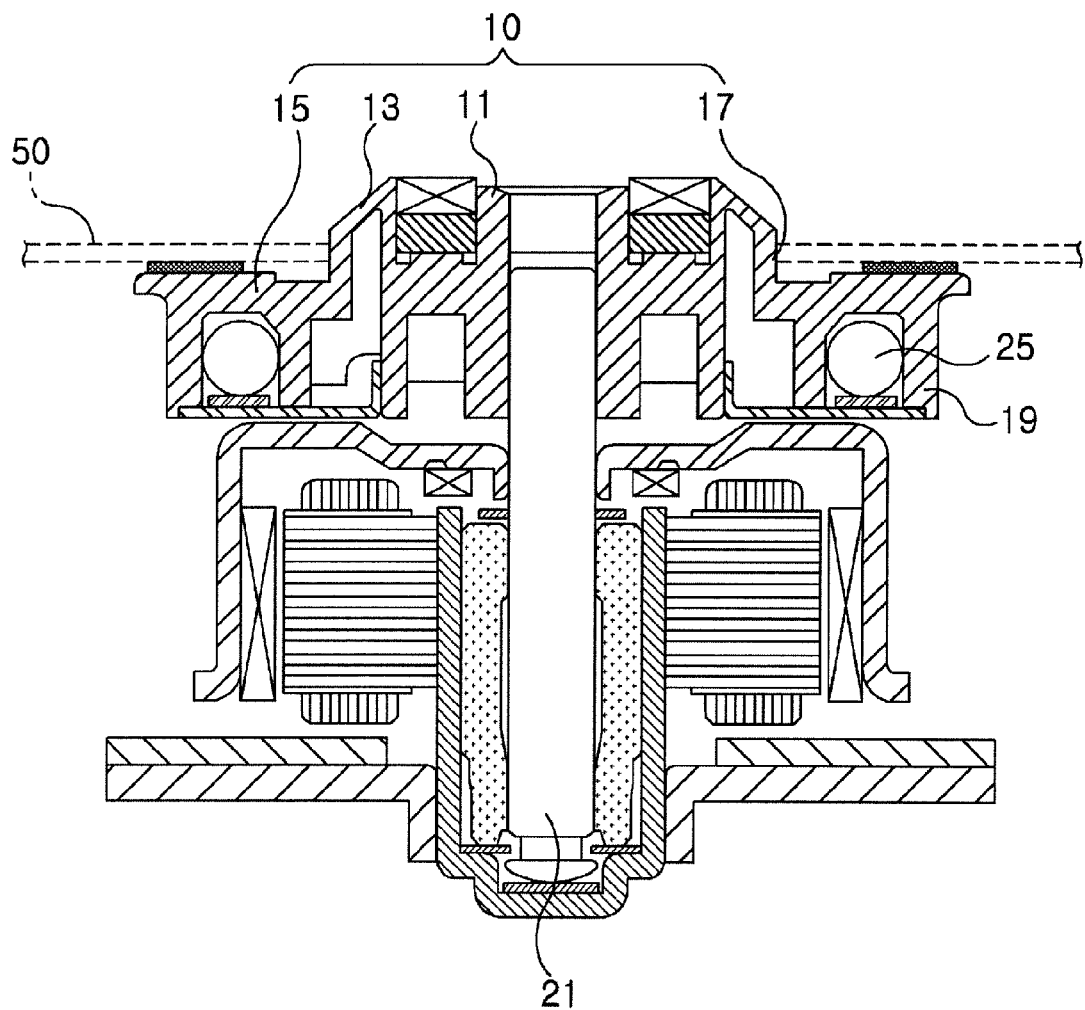
FIG. 1 is a cross-sectional view illustrating a spindle motor according to an imaginary exemplary embodiment for comparison with the present invention.
Figure 1A:
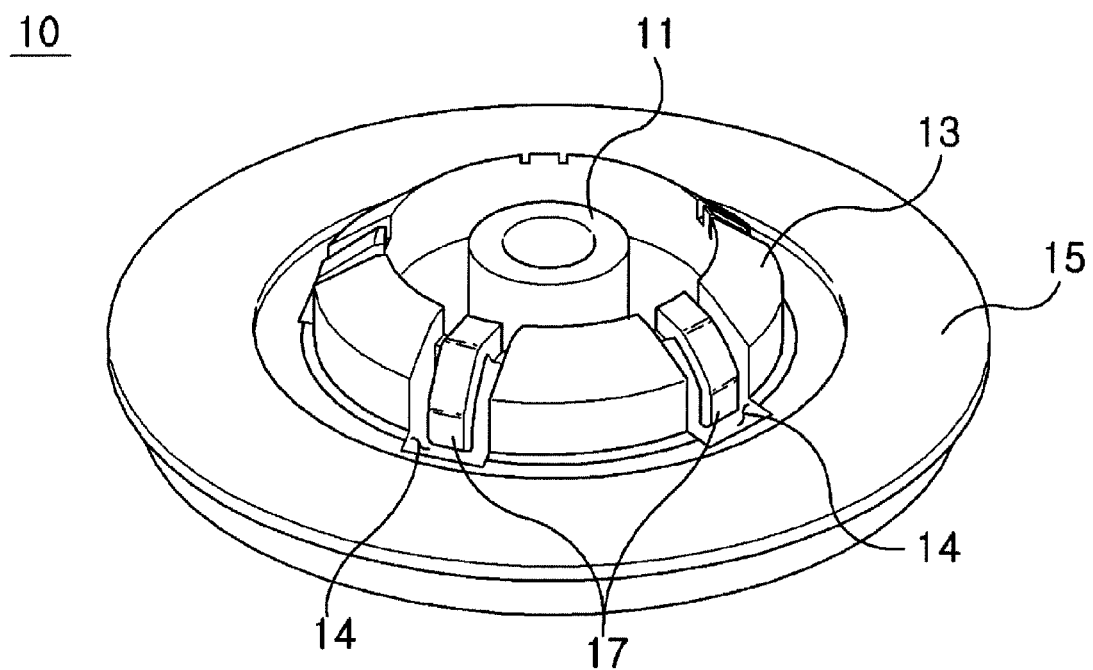
FIG. 1a is a perspective view illustrating a turn table of FIG. 1.

FIG. 1 is a cross-sectional view illustrating a spindle motor according to an imaginary exemplary embodiment for comparison with the present invention, and FIG. 1a is a perspective view illustrating a turn table of FIG. 1.

As illustrated in FIGS. 1 and 1a, a turn table 10 supportively mounted by a disk 50 is formed of a single body, and includes an axial coupling unit 11, a disk insertion unit 13, a disk accommodation unit 15, and a claw 17.

The axial coupling unit 11 having a substantially pipe-shaped body is coupled at an inner periphery by a rotation shaft 21 press-fitted thereinto. The disk insertion unit 13 having a substantially ring-shaped body is separated from an outer periphery of the axial coupling unit 11 at a predetermined distance, and is inclined at an outer lateral unit into which a disk 50 is inserted. The disk accommodation unit 15 is extensively formed from the outer periphery of the disk insertion unit 13 and is mounted with the disk 50.

A plurality of opening units 14 is formed along the disk insertion unit 13 and is formed with a claw 17. The claw 17 is independently operated from the disk insertion unit 13 and resiliently supports the disk 50 so that a center of the disk 50 inserted into the disk insertion unit 13 can correspond with that of the rotation shaft 21.

An inner diameter of a disk is conventionally 15.00 mm~5.15 mm, and in case of a DVD having two disks vertically stacked, a so called small-diameter disk may be manufactured having an actual inner diameter of 14.96 mm due to disaccord of the centers of two disks during stacking. If the center-disaccorded disks are mounted on the conventional turn table, there is a high likelihood of causing a defect known as a disk chucking. Exemplary embodiments of the present invention will now be described for solving the aforementioned drawbacks.

Figure 2:
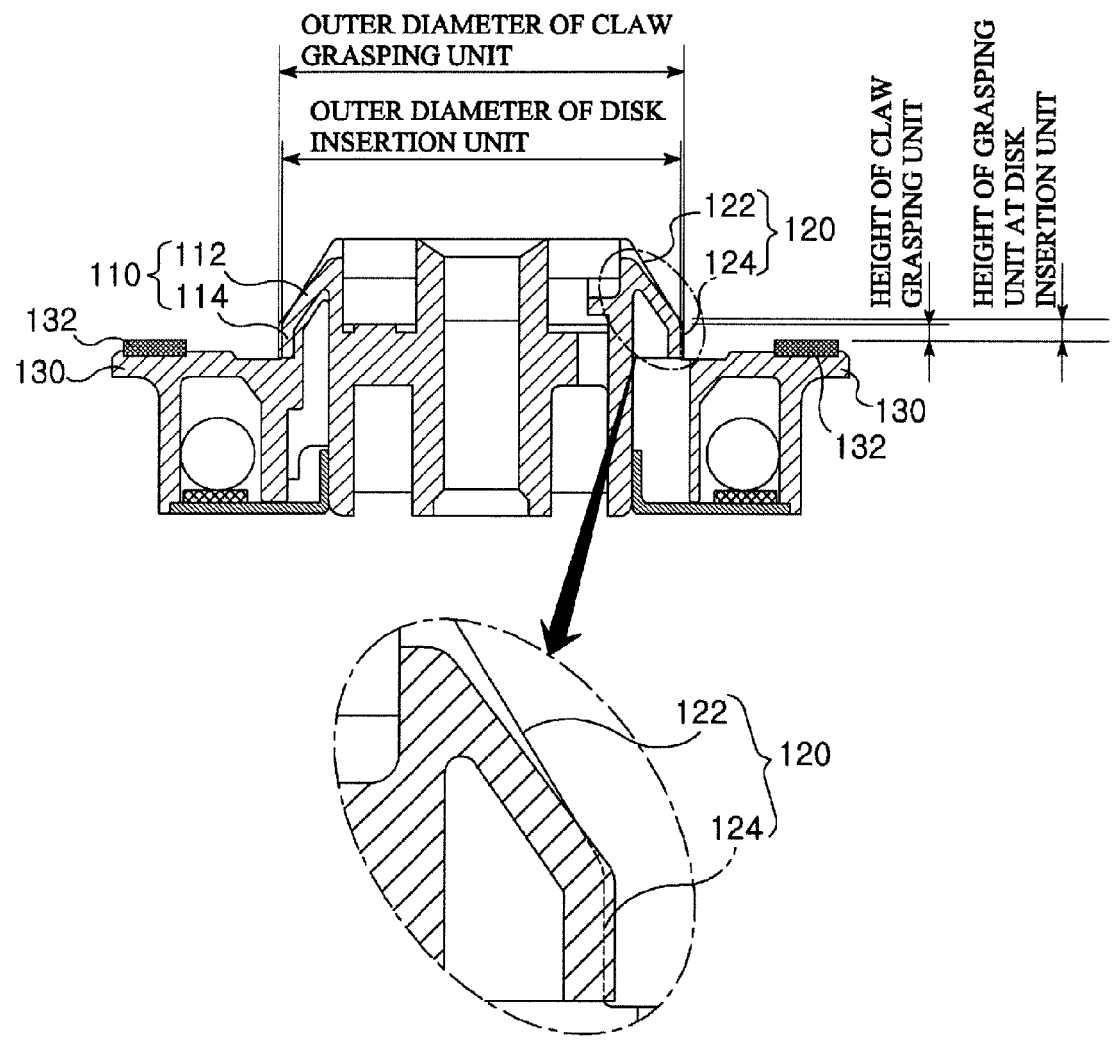
FIG. 2 is a schematic view defining dimensions of a turn table according to the present invention.

FIG. 2 is a schematic view defining dimensions of a turn table according to the present invention.

Referring to FIG. 2, the present invention serves to limit an outer diameter of a vertical portion 124 at a disk insertion unit 120 and that of a vertical claw portion 114 of a claw 110 to allow free attachment and detachment of a disk, and preferably, heights of the disk insertion unit 120 and claw 110 are restrained to enable a stable obtainment of recording and reading.

More preferably, deterioration of centering performance caused by narrowing an outer diameter of the vertical portion 124 at the disk insertion unit 120 and that of the vertical claw portion 114 at the claw 110 may be improved by restraining the insertion of the claw 110.

Referring again to FIG. 2, the disk insertion unit 120 includes an inclination portion 122 and a vertical portion 124 vertically and extensively formed from the inclination portion 122 to a disk accommodation unit 130 and contacted by inner periphery of the disk, where the inclination portion 122 functions to guide the disk to be inserted, and the vertical portion 124 functions to chuck the disk along with the claw 110.

An outer diameter of the vertical portion 124 at the disk insertion is limited to 14.94 mm to 14.96 mm, which is a limited dimension to allow being smaller than an inner diameter of a small-diameter disk by approximately 0.01%~0.15%.

If the outer diameter of the vertical portion 124 is greater than 14.96 mm, the chucking of the small-diameter disk is not smoothened, and if the outer diameter of the vertical portion 124 is smaller than 14.96 mm, the disk cannot be stably supported during chucking of the disk, such that recording and reading errors of disk may occur due to trembling of disk caused by centrifugal force when the disk is rotated at a high speed.

A height of the vertical portion 124 is a height from a disk accommodation unit 130 to a boundary between the inclination portion 122 and the vertical portion 124 of the disk insertion unit 120. However, the height of the vertical portion 124 is actually a height up to the boundary from a pad 132 because the disk accommodation unit 130 is installed with the pad 132 on which the disk is accommodated.

According to the present invention, the height of the vertical portion 124 is 0.1 mm~0.6 mm, which is approximately 8%~50% of a 1.2 mm thickness disk.

If the height of the vertical portion 124 is greater than 0.6 mm, the chucking of small-diameter disk cannot be smoothened, and if smaller than 0.1 mm, the disk cannot be stably supported during chucking of the disk, such that recording and reading errors of disk may occur due to trembling of disk caused by centrifugal force when the disk is rotated at a high speed.

Referring to FIG. 2, the claw 110 includes an inclination claw portion 112 and a vertical claw portion 114, where the inclination claw portion 112 serves to guide the disk that is inserted and the vertical claw portion 114 serves to chuck the disk.

Now, an exemplary embodiment of an outer diameter of the vertical claw portion 114 at the claw 110 will be explained.

The outer diameter of the vertical claw portion 114 at the claw 110 is limited to 15.17 mm to 15.23 mm.

If the outer diameter of the vertical claw portion 114 at the claw 110 is greater than 15.23 mm, there is a high likelihood of the chucking of a small-diameter not being smoothened to deform or break the claw 110 due to repeated attachment and detachment. If smaller than 15.17 mm, the disk cannot be stably supported during chucking of the disk, such that recording and reading errors of disk may occur due to trembling of disk caused by centrifugal force when the disk is rotated at a high speed.

The height of the vertical claw portion 114 at the claw 110 is a height from the pad 132 of the disk accommodation unit 130 to a boundary between the inclination claw portion 112 and the vertical claw portion 114 of the claw 110, as in the case of the disk insertion unit 120.

According to the present invention, the height of the vertical claw portion 114 at the claw 110 is 0.2 mm~0.5 mm, which is approximately 15% ~42% of a 1.2 mm thickness disk.

If the height of the vertical claw portion 114 is greater than 0.5 mm, the disk chucking of small-diameter disk cannot be smoothened due to repeated attachment and detachment of disks to generate a high likelihood of deforming or breaking the claw 110, and if smaller than 0.2 mm, the disk cannot be stably supported during chucking of the disk, such that recording and reading errors of disk may occur due to trembling of disk caused by centrifugal force when the disk is rotated at a high speed.

As noted above, there is a high likelihood of deteriorating the centering performance as the outer diameter of the disk insertion unit 120 is getting smaller, such that the deteriorated centering performance can be offset by limitation of claw insertion force.

The claw insertion force defines a force of a claw 110 to grasp a disk, where if the insertion force is great, the centering performance may improve but the disk chucking defects may occur if the claw insertion force becomes greater than the clamping force. Therefore, it is preferable that the claw insertion force be designed not to go over 80% of the clamping force at the maximum.

As noted above, the outer diameter and height of vertical portion 124 at the disk insertion unit 120, the outer diameter and height of vertical claw portion 114 at the claw 110 and the insertion force of claw can be selectively and properly restrained within a limited scope to smoothly chuck the small-diameter disk, and optimization of disk trembling and run-out can be restrained in the occurrence of errors on disk recording and reading.

According to the aforementioned configuration, an outer diameter and height of vertical portion at a disk insertion unit, an outer diameter and height of vertical claw portion at a claw and an insertion force of claw can be selectively and properly restrained within a limited scope to smoothly chuck a small-diameter disk, and optimization of disk trembling and run-out can be restrained in occurrence of errors on disk recording and reading.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A turn table for a spindle motor comprising:
a disk insertion unit into which an inner periphery of a disk is inserted; and
a claw resiliently pressing the inserted disk by being protruded at the disk insertion unit,
wherein the disk insertion unit is integrally formed with the claw, wherein an upper end of an inclination portion of the disk insertion unit guiding the inserted disk is higher than an upper end of an inclination portion of the claw and an outer diameter of a vertical portion at the disk insertion unit facing an inner periphery of a small-diameter disk is smaller by 0.01%~0.15% than the inner periphery of the small-diameter disk to enable a chucking of the small-diameter disk having an inner diameter of an inner periphery smaller than 15 mm,
wherein a height of the vertical portion at the disk insertion unit is 8%~50% of thickness of a disk, and
wherein a height of the vertical claw portion at the claw is 15%~42% of a thickness of a disk.

2. The turn table of claim 1, wherein an outer diameter of the vertical portion at the disk insertion unit is 14.94~14.96 mm.

3. The turn table of claim 1, wherein the height of the vertical portion is 0.1 mm~0.6 mm.

4. The turn table of claim 1, wherein an outer diameter of the claw is 15.17 mm~15.23 mm.

5. The turn table of claim 4, wherein a claw insertion force is less than 80% of a clamping force.

6. The turn table of claim 1, wherein the height of the vertical claw portion at the claw is 0.2 mm~0.5 mm.

7. A turn table for a spindle motor comprising:
an axial coupling unit to which a rotation shaft is coupled;
a disk insertion unit into which a disk is inserted;
an accommodation unit in which the inserted disk is accommodated; and
a claw formed at the disk insertion unit for resiliently supporting the inserted disk apart from the disk insertion unit,
wherein the disk insertion unit includes an inclination portion guiding the inserted disk, and a vertical portion extensively formed from the inclination portion to the disk accommodation unit to allow an inner periphery of the disk to be brought into contact, and
wherein the claw includes an inclination claw portion guiding the inserted disk and a vertical claw portion bent from the inclination claw portion to chuck the disk and the vertical claw portion is in parallel with the vertical portion of the disk insertion unit;
wherein an outer diameter of the vertical portion at the disk insertion unit is 14.94~14.96 mm and an outer diameter of the vertical claw portion at the claw is 15.17~15.23 mm, and
wherein an upper end of the inclination portion of the disk insertion unit guiding the inserted disk is higher than an upper end of the inclination claw portion of the claw,
wherein the disk insertion unit is integrally formed with the claw.

8. The turn table of claim 7, wherein a height from the disk accommodation unit to a boundary between the inclination portion and the vertical portion of the disk insertion unit is 0.1 mm ~0.6 mm, and a height from the disk accommodation unit to a boundary between the inclination claw portion and the vertical claw portion of the claw is 0.2 mm~0.5 mm.

9. The turn table of claim 8, wherein a claw insertion force is less than 80% of a clamping force.

\* \* \* \* \*